United States Patent [19]

Ogihara et al.

[11] Patent Number: 4,582,252

[45] Date of Patent: Apr. 15, 1986

[54] HEATER UNIT FOR AN AUTOMOTIVE VEHICLE AIR CONDITIONER

[75] Inventors: Yoshiyuki Ogihara; Kenzo Hirashima; Hideo Takahashi, all of Yokohama; Nobuyoshi Takahashi, Morioka, all of Japan

[73] Assignee: Nissan Motor Company, Limited, Yokohama, Japan

[21] Appl. No.: 718,223

[22] Filed: Apr. 1, 1985

[30] Foreign Application Priority Data

Apr. 4, 1984 [JP] Japan ................................ 59-66870

[51] Int. Cl.[4] .............................................. B60H 1/02
[52] U.S. Cl. .................................. 237/12.3 A; 98/2.08
[58] Field of Search ....................... 237/12.3 A, 12.3 B, 237/2 A; 98/2, 2.05, 2.08; 236/13

[56] References Cited

U.S. PATENT DOCUMENTS

| 4,453,591 | 6/1984 | Fehr | 236/13 |
|---|---|---|---|
| 4,482,009 | 11/1984 | Nishimura et al. | 237/12.3 X |
| 4,531,671 | 7/1985 | Schwenk | 237/12.3 B |

Primary Examiner—Henry Bennett
Attorney, Agent, or Firm—Leydig, Voit & Mayer, Ltd.

[57] ABSTRACT

A casing has an inlet opening and outlet openings. A partition wall divides the interior of the casing into first and second chambers and also divides the inlet opening into two segments communicating separately with the first and second chambers. A heat exchanger extends into both of the first and second chambers. Air is supplied from the first chamber to a front area of a vehicle interior via at least one of the outlet openings. Air is normally supplied from the second chamber to a rear area of the vehicle interior via the other outlet opening.

4 Claims, 4 Drawing Figures

HEATER UNIT FOR AN AUTOMOTIVE VEHICLE AIR CONDITIONER

BACKGROUND OF THE INVENTION

This invention relates to a heater unit for an automotive vehicle air conditioner.

Some automotive vehicle air conditioners have a series combination of a blower unit, a cooling unit, and a heater unit. In the case of a high-grade air conditioner which allows independent control of front and rear parts of the vehicle interior, a heater unit tends to be large. To increase the free space in the vehicle interior, it is desirable for the heater unit to be compact.

It is advantageous that several kinds of air conditioners are adaptable to automotive vehicles of the same type. In this case, the heater unit of the high grade air conditioner would preferably have the same configuration as other air conditioners, since a common configuration would enable any heater unit to be attached to the vehicle body without changing the design of the vehicle body. Heater units for lower-grade air conditioners are simpler in structure than heater units for the higher-grade air conditioner. Accordingly, to make the heater units for both types of air conditioner compatible, it is preferable for the high-grade heater unit to be compact.

SUMMARY OF THE INVENTION

It is an object of this invention to provide a compact heater unit for an automotive vehicle air conditioner.

In accordance with this invention, a heater unit includes a casing and a first partition wall dividing an interior of the casing into first and second chambers. The casing has an inlet opening which is divided by the first partition wall into two segments communicating separately with the first and second chambers. A heat exchanger extends into both of the first and second chambers. First and second passages lie in the first and second chambers respectively and bypass the heat exchanger. A section of the casing defining the first chamber has a ventilator outlet opening, a rear outlet opening, and a heater outlet opening. A section of the casing defining the second chamber has a defroster outlet opening. A second partition wall having a floor aperture is disposed within the first chamber. The second partition wall and the casing define a third passage to which the heater outlet opening is exposed. A third partition wall is disposed within the first chamber. The third partition wall and the casing define a fourth passage connecting the rear outlet opening to a rear communication aperture formed through the first partition wall. A fourth partition wall having an aperture is disposed within the second chamber. The fourth partition wall and the casing define a fifth passage to which the rear communication aperture is exposed. A fifth partition wall having an aperture is disposed within the second chamber. The fifth partition wall and the casing define a sixth passage connecting the defroster outlet opening to a defroster communication aperture formed through the first partition wall. A first movable door disposed within the first chamber adjustably blocks and unblocks the first passage. A second movable door disposed within the second chamber adjustably blocks and unblocks the second passage. A third movable door disposed within the second chamber adjustably blocks and unblocks the defroster outlet opening. A fourth door disposed within the first chamber adjustably blocks and unblocks the floor aperture. A sixth movable door disposed within the second chamber adjustably blocks and unblocks the apertures through the fourth and fifth partition walls.

DESCRIPTION OF THE PREFERRED EMBODIMENTS

Figure 1:
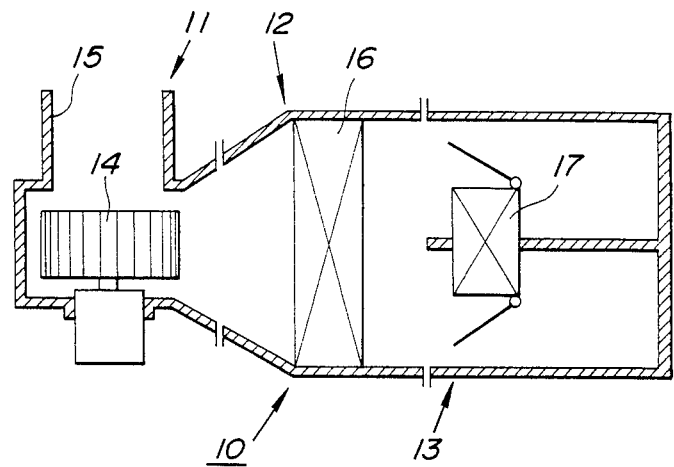
FIG. 1 is a diagram of a duct arrangement including a heater unit according to an embodiment of this invention.

With reference to FIG. 1, an automotive vehicle air conditioner includes a duct arrangement 10 having a series combination of a blower unit 11, a cooling unit 12, and a heater unit 13. A blower or fan 14 disposed within the upstream unit 11 serves to draw in air via an inlet 15 formed in the unit 11 and drive the air through the duct arrangement 10. A cooling system includes an evaporator 16 disposed within the intermediate unit 12. The evaporator 16 serves to cool the air. A heater core or heat exchanger 17 disposed within the downstream unit 13 serves to heat the air. A heating source or medium, for instance, engine coolant flows through the heater core 17.

Figure 2:
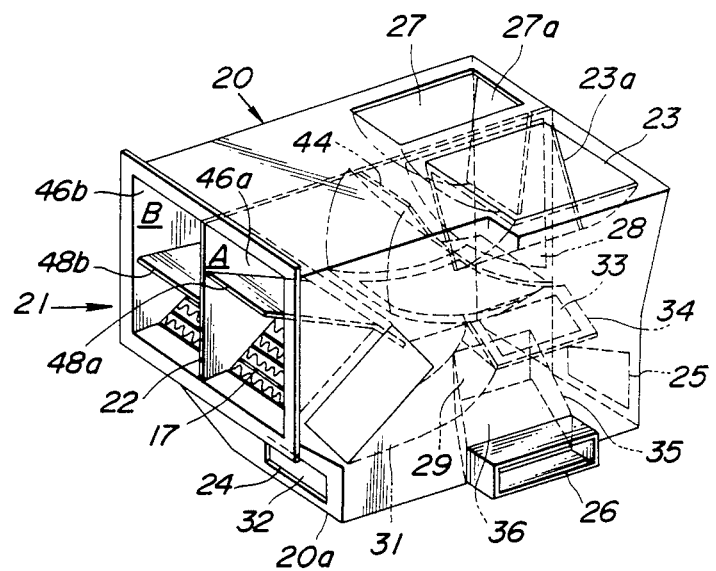
FIG. 2 is a perspective view of the heater unit of FIG. 1.
Figure 3:
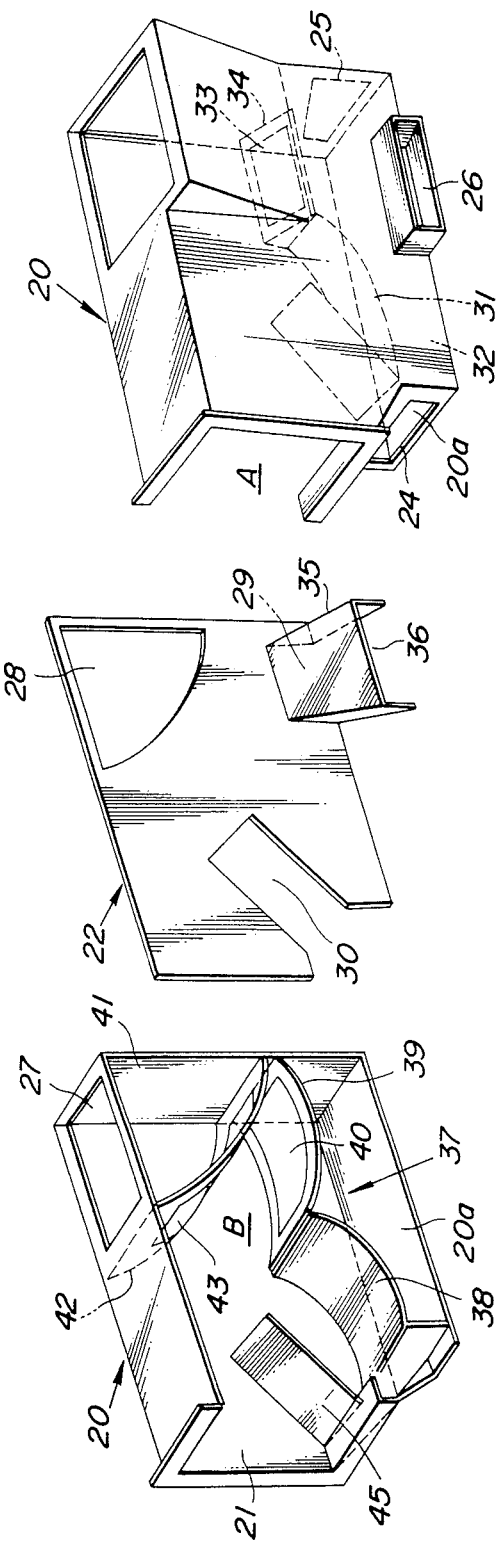
FIG. 3 is an exploded perspective view of the heater unit of FIG. 2. A heater core and doors are omitted from FIG. 3 for clarity.

As shown in FIGS. 2 and 3, the heater unit 13 includes an approximately box-shaped casing 20 having an air inlet opening 21 at one end. A partition wall 22 fixedly disposed within the casing 20 separates the interior of the casing 20 into air chambers A and B. Also, the partition wall 22 divides the inlet opening 21 into two segments communicating with the air chambers A and B respectively. The first air chamber A leads to a ventilator air outlet opening 23, and heater air outlet openings 24 and 25. The outlet opening 23 is formed through the top wall of the casing 20 defining the air chamber A. The outlet opening 24 located below the inlet opening 21 passes through the end wall of the casing 20 defining the air chamber A. The outlet opening 25 passes through the opposite end wall of the casing 20 defining the air chamber A. The second air chamber B leads to a rear air outlet opening 26 and a defroster air outlet opening 27. The rear outlet opening 26 extends through the side wall of the casing 20 defining the first air chamber A. The connection between the second air chamber B and the rear outlet opening 26 will be described hereafter. The defroster outlet opening 27 passes through the top wall of the casing 20 defining the second air chamber B. The defroster outlet opening 27 is located near the ventilator outlet opening 23.

A ventilator door 23a pivotally supported on the casing 20 adjustably blocks and unblocks the ventilator outlet opening 23. A defroster door 27a pivotally supported on the casing 20 adjustably blocks and unblocks the defroster outlet opening 27. A section of the partition wall 22 adjacent the defroster outlet opening 27 has a defroster communication aperture 28 in the shape of a circular sector. The partition wall 22 also has a rear communication aperture 29 below the defroster communication aperture 28. A cut or groove 30 formed in the partition wall 22 extends obliquely from the lower corner of the wall adjacent the lower edge of the inlet opening 21.

A partition wall 31 fixedly disposed within the first air chamber A defines a passage 32 in conjunction with the bottom wall 20a and the side wall of the casing 20, and the partition wall 22. This passage 32 leads to the heater outlet openings 24 and 25. The partition wall 31 has a floor aperture 33. A pivotal floor door 34 adjustably blocks and unblocks the floor aperture 33. A partition wall 35 of U-shaped cross-section fixedly disposed within the passage 32 defines a passage 36 in conjunction with the casing bottom wall 20a. This passage 36 connects the rear communication aperture 29 and the rear outlet opening 26. In this way, the second air chamber B leads to the rear outlet opening 26.

A partition wall 38 fixedly disposed within the second air chamber B defines a passage 37 in conjunction with the casing bottom wall 20a, the casing side wall, and the partition wall 22. The rear communication aperture 29 through the partition wall 22 is exposed to the passage 37. In other words, the passage 37 directly communicates with the aperture 29. A section 39 of the partition wall 38 opposing the defroster outlet opening 27 is convex downwards. This curved section 39 of the partition wall 38 has an aperture 40. A partition wall 42 fixedly disposed within the second air chamber B defines a passage 41 in conjunction with the side and end walls of the casing 20. This passage 41 connects the defroster communication aperture 28 and the defroster outlet opening 27. The partition wall 42 is curved in correspondence with the curved section 39 of the partition wall 38. The partition wall 42 has an aperture 43. A front door 44 disposed within the second air chamber B is hinged along one edge to the lower edge of the partition wall 42. The front door 44 is curved in correspondence with the curved section 39 of the partition wall 38. The front door 44 adjustably blocks and unblocks the apertures 40 and 43.

The side wall of the casing 20 has a cut or groove 45 aligned with the cut 30 in the partition wall 22. The heater core 17 fits into the cuts 30 and 45 and extends into both of the air chambers A and B near the inlet opening 21. The heater core 17 is spaced from the top wall of the casing 20 so that passages 46a and 46b bypassing the heater core 17 are formed in the air chambers A and B. Air mixing doors 48a and 48b pivotally connected to the upper edge of the heater core 17 adjustably block and unblock the bypass passages 46a and 46b respectively.

In operation, air from the cooling unit 12 enters the heater unit 13 via the inlet opening 21. A portion of the air passes through the heater core 17 and is heated by the core 17. The other portion of the air flows through the passages 46a and 46b and bypasses the heater core 17. The ratio between the flow rates of heated air and non-heated air depends on the angular positions of the air mixing doors 48a and 48b. The heated air and the non-heated air mix in regions of the air chambers A and B downstream of the air mixing doors 48a and 48b.

In the first air chamber A, the air is directed toward the ventilator outlet opening 23, the floor aperture 33, and the defroster communication aperture 28. The air moves out of the heater unit 13 via the ventilator outlet opening 23. The rate of air flow through the opening 23 depends on the angular position of the ventilator door 23a. The air flows into the passage 32 via the floor aperture 33. The rate of air flow through the aperture 33 depends on the angular position of the floor door 34. After the air has passed through the passage 32, the air moves out of the heater unit 13 via the heater outlet openings 24 and 25 and into a front part of the vehicle passenger compartment. The air moves into the passage 41 via the defroster communication aperture 28. Provided that the defroster door 27a unblocks the outlet opening 27, the air moves out of the heater unit 13 via the outlet opening 27 after the air has exited from the passage 41. In general, the air is guided from the outlet opening 27 to a defroster nozzle (not shown). When the defroster door 27a blocks the outlet opening 27, the air flow through the opening 27 is interrupted.

In the second air chamber B, provided that the front door 44 fully blocks the aperture 43 and thus unblocks the aperture 40, the air is directed toward the aperture 40 and flows into the passage 37 via the aperture 40. The air moves from the passage 37 into the passage 36 via the communication aperture 29. After the air exits from the passage 36, the air moves out of the heater unit 13 via the rear outlet opening 26. A duct (not shown) connecting the outlet opening 26 to a rear area of the interior of the vehicle guides the air from the heater unit 13 to the rear part of the passenger compartment. Accordingly, conditioned air flows evenly over a passenger or passengers in the rear seats. When the front door 44 fully blocks the aperture 40 and thus unblocks the aperture 43, the conditioned air supply to the passenger compartment rear area via the rear outlet opening 26 is interrupted. In this case, the air moves into the passage 41 via the aperture 43, finally exiting from the heater unit 13 via the defroster outlet opening 27, the ventilator outlet opening 23, and the heater outlet openings 24 and 25.

Since the curvature of the front door 44 corresponds to that of the curved partition walls 39 and 42, the front door 44 can sealingly contact these walls 39 and 42. Accordingly, when the front door 44 blocks the aperture 40 or 43 defined by the wall 39 or 42, air leakage through the aperture 40 or 43 is reliably prevented.

It should be noted that actuators or manually operable members are generally connected to the doors 23a, 27a, 34, 44, 48a, and 48b to externally operate them.

Figure 4:
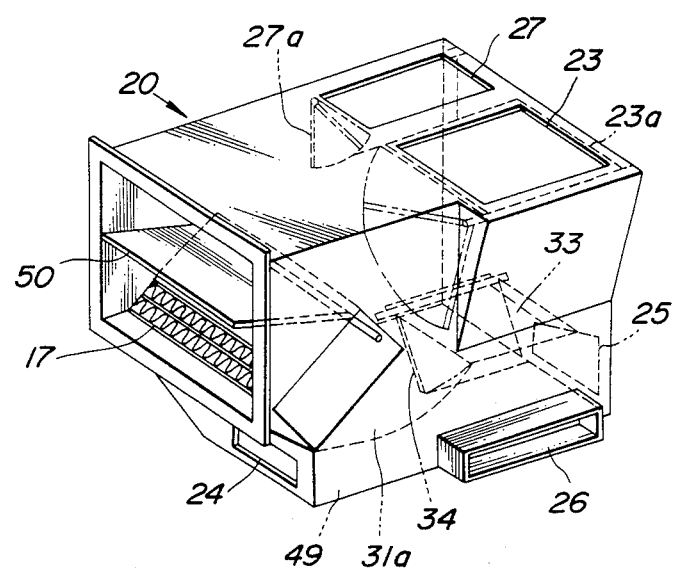
FIG. 4 is a perspective view of a modified heater unit of this invention.

FIG. 4 shows a modified heater unit, which is adaptable to an air conditioner having no air outlet for air-conditioning a rear area of the passenger compartment. This modified heater unit is similar to the heater unit of FIGS. 1 to 3 except for the following design changes.

The partition walls 22, 31, 35, 38, and 42 (see FIGS. 2 and 3) are omitted. A partition wall 31a having a portion similar to the partition wall 31 (see FIGS. 2 and 3) is fixedly disposed within the casing 20. This partition wall 31a defines a chamber 49 in conjunction with the casing bottom wall 20a, the casing side walls, and the casing end walls. The partition wall 31a has a floor aperture 33 which is adjustably blocked and unblocked by a pivotal floor door 34. When the floor door 34 unblocks the aperture 33, the inlet opening 21 communicates with the chamber 49. The outlet openings 24, 25, and 26 are exposed to this chamber 49. The outlet opening 26 serves to discharge air into a front area of the vehicle interior in addition to the outlet openings 24 and 25.

A single air mixing door 50 disposed within the casing 20 is pivotally connected to the heater core 17. The location of the pivotal connection between the ventilator door 23a and the casing 20 differs from that in the heater unit of FIGS. 1 to 3. Also, the location of the pivotal connection between the defroster door 27a and the casing 20 differs from that in the heater unit of FIGS. 1 to 3.

The casing 20 has the same shape as in FIGS. 1 to 3. Accordingly, the modified heater unit can be attached to the cooling unit 12 of FIG. 1 without changing the configuration of the cooling unit or of attaching members.

What is claimed is:

1. A heater unit for an automotive vehicle air conditioner, comprising:

(a) a casing having an inlet opening;
   (b) a first partition wall disposed within the casing and dividing the interior of the casing into first and second chambers, the partition wall dividing the inlet opening into two segments communicating separately with the first and second chambers;
   (c) a heat exchanger extending into both of the first and second chambers, the heat exchanger and the casing defining first and second passages which lie within the first and second chambers respectively and which bypass the heat exchanger;
   (d) a section of the casing defining the first chamber having a ventilator outlet opening, a rear outlet opening, and a heater outlet opening;
   (e) a section of the casing defining the second chamber having a defroster outlet opening;
   (f) a second partition wall disposed within the first chamber and having a floor aperture, the second partition wall and the casing defining a third passage to which the heater outlet opening is exposed;
   (g) a third partition wall disposed within the first chamber, the third partition wall and the casing defining a fourth passage connecting the rear outlet opening to a rear communication aperture passing through the first partition wall;
   (h) a fourth partition wall disposed within the second chamber and having an aperture, the fourth partition wall and the casing defining a fifth passage to which the rear communication aperture is exposed;
   (i) a fifth partition wall disposed within the second chamber and having an aperture, the fifth partition wall and the casing defining a sixth passage connecting the defroster outlet opening to a defroster communication aperture passing through the first partition wall;
   (j) a first movable door disposed within the first chamber for adjustably blocking and unblocking the first passage;
   (k) a second movable door disposed within the second chamber for adjustably blocking and unblocking the second passage;
   (l) a third movable door disposed within the second chamber for adjustably blocking and unblocking the defroster outlet opening;
   (m) a fourth movable door disposed within the first chamber for adjustably blocking and unblocking the ventilator outlet opening;
   (n) a fifth movable door disposed within the first chamber for adjustably blocking and unblocking the floor aperture; and
   (o) a sixth movable door disposed within the second chamber for adjustably blocking and unblocking the apertures through the fourth and fifth partition walls.

2. The heater unit of claim 1, wherein the heat exchanger is located near the inlet opening.

3. The heater unit of claim 1, wherein the first and second doors are pivotally connected to the heat exchanger.

4. The heater unit of claim 1, wherein the sixth door is curved, and the fourth and fifth partition walls essentially conform with the curved sixth door.

* * * * *